B. A. GEIGER.
LIFE PRESERVER.
APPLICATION FILED FEB. 23, 1916. RENEWED MAR. 28, 1917.
1,230,290.
Patented June 19, 1917.
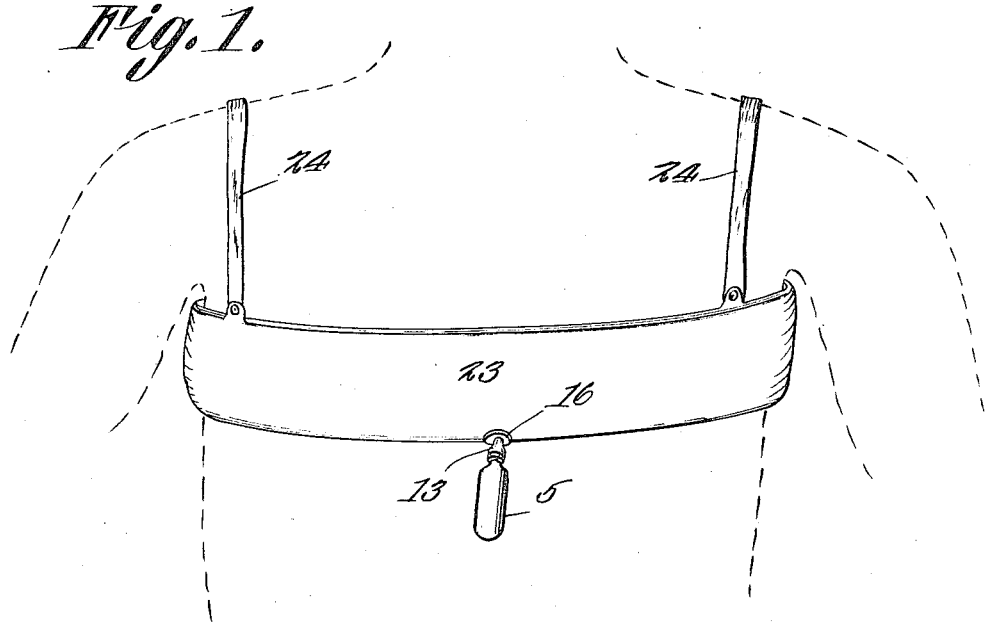
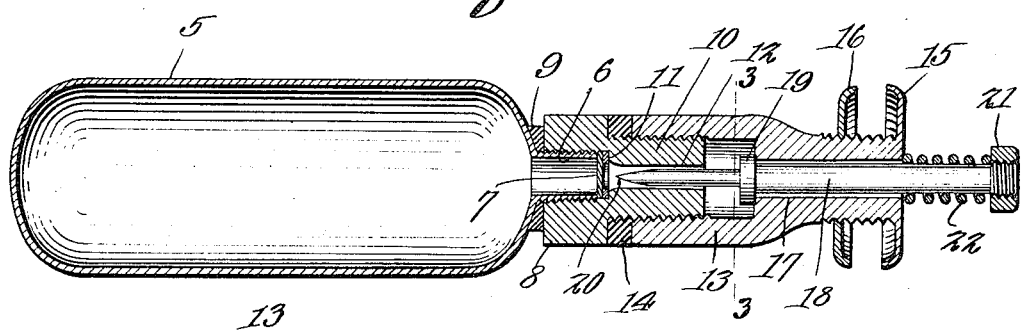

UNITED STATES PATENT OFFICE.

BERTHA A. GEIGER, OF CHICAGO, ILLINOIS, ASSIGNOR, BY DIRECT AND MESNE ASSIGNMENTS, OF ONE-HALF TO WILLIAM F. GEIGER, OF CHICAGO, ILLINOIS, AND ONE-HALF TO EDMUND W. LAWRENCE, OF MOUNT VERNON, NEW YORK.

LIFE-PRESERVER.

1,230,290. Specification of Letters Patent. Patented June 19, 1917.

Application filed February 23, 1916, Serial No. 79,932. Renewed March 28, 1917. Serial No. 158,115.

*To all whom it may concern:*

Be it known that I, BERTHA A. GEIGER, a citizen of the United States, residing at Chicago, in the county of Cook and State of Illinois, have invented new and useful Improvements in Life-Preservers, of which the following is a specification.

This invention relates to life preservers which consist of inflatable tubes, and the invention has for its object to provide in a life preserver of this type a novel and improved means for inflating the same, a container being provided which is connected to the belt and carries a gas under sufficient pressure to inflate the belt when released.

The invention also has for its object to provide novel and improved means for opening the container so that it may discharge into the belt.

With the objects stated in view, the invention consists in a novel combination and arrangement of parts to be hereinafter described and claimed, and in order that the same may be better understood reference is had to the accompanying drawing forming a part of this specification.

In the drawing—

Figure 1 is an elevation of the apparatus; Fig. 2 is an enlarged sectional detail of the inflating device, and Fig. 3 is a cross-section on the line 3—3 of Fig. 2.

Referring specifically to the drawing, 5 denotes a container for holding an inflating gas, such as oxygen, under suitable pressure. The container has the shape of a bottle, and it is made of steel, sufficiently strong to withstand the pressure of its contents. The bottle has an outlet nipple 6 which is threaded exteriorly, and sealed by a copper disk 7. On the nipple is screwed a cap 8 with a composition washer 9 between the latter and the bottle to prevent the latter from being jammed by the cap. The cap is angular in cross-section to permit the application of a wrench, and its outer end is reduced, as indicated at 10, and screw threaded. Between the cap and the sealing disk 7 is interposed a lead washer 11. In line with the nipple, the cap has a longitudinal opening 12 which extends throughout its entire length.

On the reduced threaded portion 10 of the cap 8 is screwed a nut 13 with a composition gasket 14 between the inner end of the nut and the shoulder on the cap formed by the part 10.

The outer end of the nut 13 is reduced and formed with a circular clamping jaw 15 coöperating with a similar jaw 16 which is movably mounted on said reduced portion of the nut back of the jaw 15, said portion of the nut being screw threaded and the jaw 16 being screwed thereon.

The nut 13 has a longitudinal opening 17 which is in alinement with the opening 12 in the cap 8 but of larger diameter. In the opening 17 is slidably mounted a puncturing device in the form of a stem 18 having a stop flange 19 at the inner end of the opening, and extending into the opening 12, the stem here tapering to a sharp point 20 in proximity to the disk 7. The stem extends from the outer end of the nut 13 to take an abutment 21, with a spring 22 coiled around the stem between the abutment and the outer end of the nut. This spring serves to hold the stem retracted.

The inflating device hereinbefore described is attached to an inflatable belt 23 having shoulder straps 24 for attachment to the person. The belt is apertured for the insertion of the end of the nut 13 having the jaws 15 and 16, and it is secured by the latter, the aperture being suitably reinforced.

When the belt is in place on the person, the inflating device hangs from the bottom of the collapsed belt as shown in Fig. 1. To inflate the belt, the container is swung up to horizontal position and pressed against the body, whereupon the outer end of the stem 18 which is inside the belt, is pushed in a direction to carry the pointed end 20 to the disk 7, a slight pressure puncturing the latter and allowing the gas in the container 5 to enter the belt, it passing along the stem 18, the latter having sufficient clearance in the openings 12 and 17 to permit the escape of the gas. The belt is thus instantly inflated and will be ready for use as a life preserver.

The device is compact and may be worn without inconvenience when not actually required, so that it is at all times ready for an emergency.

The stop flange 19 has edge recesses 19$^a$ as shown in Fig. 3, the object of these recesses being to insure the free passage of the gas past the flange. Without these recesses a sudden pressure behind the flange may force it back to close the opening 17.

I claim:—

1. The combination with an inflatable life preserver, of an inflating-gas container having an outlet, a closure for the outlet, a cap mounted over the closure, said cap having a gas passage, means carried by the cap for attaching the same to the life preserver, said means having a gas passage opening into the life preserver and communicating with the first-mentioned gas passage, and a puncturing device for the closure slidably mounted in said passages.

2. The combination with an inflatable life preserver, of an inflating-gas container having an outlet, a closure for the outlet, a cap mounted over the closure, said cap having a gas passage, means carried by the cap for attaching the same to the life preserver, said means having a gas passage opening into the life preserver, and communicating with the first-mentioned gas passage, and a puncturing device for the closure slidably mounted in said passages and having an actuating extension passing into the life preserver.

In testimony whereof I affix my signature.

BERTHA A. GEIGER.